(12) United States Patent
Baque (10) Patent No.: US 11,686,832 B2
(45) Date of Patent: Jun. 27, 2023

(54) ULTRASONIC TARGET FOR THE PURPOSES OF NON-DESTRUCTIVE INSPECTION

(71) Applicant: Commissariat à l'Energie Atomique et aux Energies Alternatives, Paris (FR)

(72) Inventor: François Baque, Lambesc (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 17/305,405

(22) Filed: Jul. 7, 2021

(65) Prior Publication Data

US 2022/0011421 A1 Jan. 13, 2022

(30) Foreign Application Priority Data

Jul. 8, 2020 (FR) ..................................... 20 07249

(51) Int. Cl.
*G01S 7/539* (2006.01)
*G01N 29/44* (2006.01)
(Continued)

(52) U.S. Cl.
CPC .......... *G01S 7/539* (2013.01); *G01N 29/4436* (2013.01); *G01S 15/10* (2013.01); *G01S 15/50* (2013.01)

(58) Field of Classification Search
None
See application file for complete search history.

(56) References Cited

U.S. PATENT DOCUMENTS

| 3,195,677 A | * | 7/1965 | Hillery | G10K 11/205 |
| | | | | 367/1 |
| 3,365,790 A | * | 1/1968 | Brauer | G02B 5/124 |
| | | | | 359/530 |

(Continued)

FOREIGN PATENT DOCUMENTS

| EP | 2500701 A1 | * | 9/2012 | ............ G01J 3/4535 |
| EP | 2796905 A1 | * | 10/2014 | ............ G01B 11/26 |

(Continued)

OTHER PUBLICATIONS

French Preliminary Search Report dated Mar. 11, 2021 in French Application 20 07249 filed on Jul. 8, 2020, 13 pages (with English Translation of Categories of Cited Documents & Written Opinion).

(Continued)

*Primary Examiner* — Isam A Alsomiri
*Assistant Examiner* — Vikas Atmakuri
(74) *Attorney, Agent, or Firm* — Oblon, McClelland, Maier & Neustadt, L.L.P.

(57) ABSTRACT

An ultrasonic target, including a main reflector, the main reflector including three main faces, extending from a main vertex, the main faces forming a main trirectangular trihedron; defining a main base plane, lying facing the main vertex, and forming a base of the main trirectangular trihedron; the target including at least one auxiliary reflector fastened to the main reflector, the or each auxiliary reflector including three auxiliary faces, extending from an auxiliary vertex, the auxiliary faces forming an auxiliary trirectangular trihedron; defining an auxiliary base plane, lying facing the auxiliary vertex, and forming a base of the auxiliary trirectangular trihedron.

14 Claims, 8 Drawing Sheets

(51) Int. Cl.
  *G01S 15/10* (2006.01)
  *G01S 15/50* (2006.01)

(56) References Cited

U.S. PATENT DOCUMENTS

| | | | | |
|---|---|---|---|---|
| 3,923,378 | A * | 12/1975 | Heenan | G02B 5/124 |
| | | | | 359/530 |
| 4,126,847 | A * | 11/1978 | Etkins | G10K 11/205 |
| | | | | 181/175 |
| 4,356,880 | A * | 11/1982 | Downs | E04B 1/99 |
| | | | | 52/630 |
| 4,990,918 | A * | 2/1991 | Michelson | H01Q 15/18 |
| | | | | 342/7 |
| 5,097,265 | A * | 3/1992 | Aw | H01Q 15/18 |
| | | | | 342/9 |
| 5,589,981 | A * | 12/1996 | Kasser | G02B 5/122 |
| | | | | 356/152.3 |
| 6,742,903 | B2 * | 6/2004 | Canning | G02B 5/12 |
| | | | | 342/7 |
| 8,857,368 | B2 * | 10/2014 | Huskamp | G01S 19/00 |
| | | | | 367/101 |
| 8,910,743 | B2 * | 12/2014 | Tiltman | G01T 1/2002 |
| | | | | 181/120 |
| 9,846,232 | B1 * | 12/2017 | Thompson | G01S 15/89 |
| 2009/0137906 | A1 | 5/2009 | Maruyama et al. | |
| 2012/0117807 | A1 | 5/2012 | Maruyama et al. | |
| 2014/0169968 | A1 | 6/2014 | Hedeen et al. | |
| 2014/0180104 | A1 | 6/2014 | Maruyama et al. | |

FOREIGN PATENT DOCUMENTS

| | | | | |
|---|---|---|---|---|
| GB | | 2204217 A * | 11/1988 | G10K 11/205 |
| WO | WO-9511465 A2 * | | 4/1995 | G02B 5/124 |
| WO | WO-2011067341 A1 * | | 6/2011 | F41G 3/225 |

OTHER PUBLICATIONS

Ploix et al., "Acoustical properties of an immersed corner-cube retroreflector alone and behind screen for ultrasonic telemetry applications", Ultrasonics, vol. 106, Apr. 2, 2020, 10 pages.

* cited by examiner

ULTRASONIC TARGET FOR THE PURPOSES OF NON-DESTRUCTIVE INSPECTION

FIELD

The technical field of the invention relates to non-destructive inspection with ultrasound, and in particular to inspection of a piece of equipment located in a hostile environment.

PRIOR ART

Certain industrial installations are subject to regular inspections, in order to check the integrity of equipment or of structures. These inspections are carried out to meet regulatory requirements and/or to meet the dictates of safety. It is a question of checking the integrity of a structure or of a component, or of performing an inspection of their location or a dimensional inspection.

However, certain environments are unsuitable for visual inspecting techniques based on conventional image sensors. It is for example a question of installations in which temperature or irradiation levels are very high. It may also be a question of environments submerged in an opaque liquid, or masked by opaque screens, metal screens for example. This type of conditions may be encountered in the nuclear industry, for example in fast-neutron reactors cooled by liquid sodium or by liquid lead, or even in installations related to the nuclear-fuel cycle comprising tanks that may contain internal pieces of equipment that cannot be seen from the exterior.

In this type of installation, ultrasonic inspecting techniques allow this type of difficulties to be overcome. They allow installations to be monitored during operation, or periodic inspections, or prior to maintenance or dismantling operations. The propagation of ultrasound through various media, whether liquid or solid, is then exploited.

The principle of such measurements is well known: an incident acoustic wave is transmitted by a transmitter in the direction of a piece of equipment or structure to be inspected. The latter reflects the incident wave. A portion of the reflected wave is then detected by a detector. To carry out this type of measurement, it is conventional to use ultrasonic transducers, which play the role both of transmitter and of receiver.

The incident wave is generally pulsed, or takes the form of a brief wave train. The reflected wave, i.e. the wave that propagates back to the detector, is conventionally designated an "echo". Implementation of acoustic measurements is advantageous because of the maturity of the instrumentation and because of the high-performance of the associated imaging software. Generally, the amplitude of the reflected acoustic wave, and its time-of-flight, are exploited. The time-of-flight corresponds to the time interval between the transmission of the incident acoustic wave and the detection of the reflected acoustic wave (echo).

However, the transmitted or reflected acoustic waves generally undergo attenuations between the transmitting/receiving transducer and the equipment that is the subject of the inspection. This is notably the case when a screen, a thickness of metal for example, is interposed between the transducer and the equipment to be inspected. In order to increase the intensity of the reflected wave propagating toward the transducer, it is possible to place targets, called triangular corner reflectors, on the inspected equipment.

Figure 1:
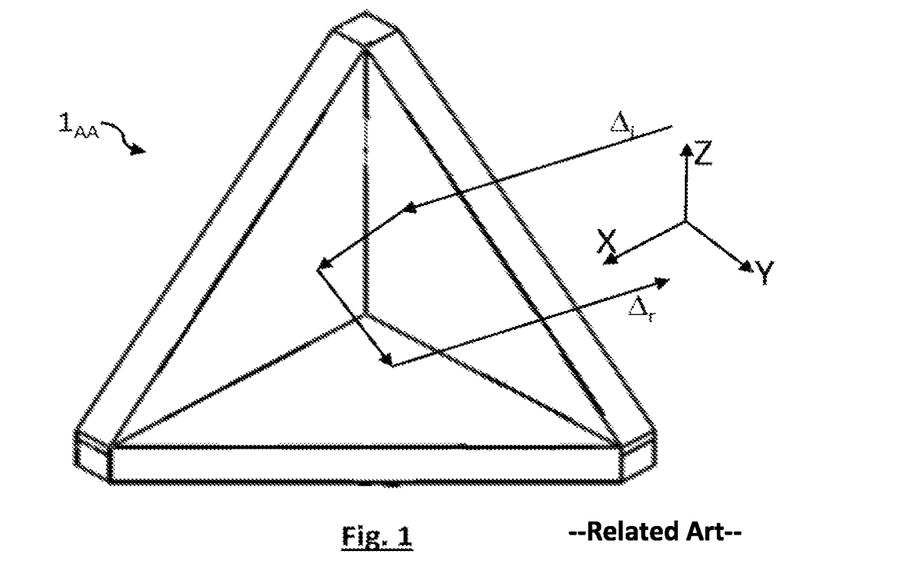
FIG. 1 shows a target according to the prior art.

The operating principle of a triangular corner reflector is well known, notably in the field of optics since it is a question of a basic principle of catadioptrics. Such a target $1_{AA}$ consists of 3 orthogonal planar faces, as shown in FIG. 1. When it is exposed to an incident acoustic wave propagating parallel to an axis of incidence $\Delta_i$, such a triangular corner reflector, usually designated a "cube corner", possesses the property of reflecting the ultrasonic wave along an axis of propagation $\Delta_r$ parallel to the axis of the incident wave. This is due to the three successive reflections of the acoustic wave from the various orthogonal faces of the target. This property is observed when the incidence is limited to about 25° to 30° with respect to the normal to the main base plane of the target. The intensity of the reflected wave increases with the area of the target, and with the centrality of the axis of incidence $\Delta_i$ with respect to the target. Thus, a target is qualified echogenic because it generates an echo that is more intense than an echo resulting from a specular reflection from a planar wall.

Use of a target to reflect acoustic waves has already been described, for example in EP2192593. In the latter, the target is placed on a piece of equipment, in the present case a pump of a nuclear reactor. The target is either planar, or formed from two orthogonal planes. It is used as an ultrasonic reflector for inspecting vibration of the equipment, irrespectively of whether it is a question of inspecting the amplitude or the frequency of vibration. Document JP56004006 describes use of a triangular corner reflector to reflect acoustic waves.

Use of various reflective targets, of triangular shape, placed on the same piece of equipment but in a plurality of different locations, is described in EP2937711. It is a question of reflecting electromagnetic waves for the purposes of inspecting vibration.

It will be noted that none of the aforementioned documents describes using a triangular corner reflector that is fastened to a piece of equipment and that is intended to be used, alone, as an acoustic reflector to allow a quantitative estimation of a movement of a piece of equipment. The invention described below addresses this problem. It allows a movement, notably a two-dimensional or three-dimensional movement, of a piece of equipment to which a target that acts as an ultrasonic reflector has been fastened, to be estimated quantitatively. The movement may be estimated with a single target.

SUMMARY OF THE INVENTION

A first subject of the invention is an ultrasonic target, comprising a main reflector, the main reflector:
  comprising three main faces, extending from a main vertex, the main faces forming a main trirectangular trihedron;
  defining a main base plane, lying facing the main vertex, and forming a base of the main trirectangular trihedron;
the target being characterized in that it comprises at least one auxiliary reflector fastened to the main reflector, the or each auxiliary reflector:
  comprising three auxiliary faces, extending from an auxiliary vertex, the auxiliary faces forming an auxiliary trirectangular trihedron;
  defining an auxiliary base plane, lying facing the auxiliary vertex, and forming a base of the auxiliary trirectangular trihedron.

The target is preferably such that the auxiliary base plane or each auxiliary base plane, is parallel to the main base plane.

The main reflector, and each auxiliary reflector, are configured to reflect an incident ultrasonic wave propagating along an axis of incidence, so as to form a reflected wave propagating along an axis of reflection parallel to the axis of incidence. The axis of incidence is preferably located in an angular range of incidence extending up to an angle of 25° or 30° about an axis perpendicular to the main base plane.

The main reflector and each auxiliary reflector form a monolithic target. The target is of integral construction. Thus, the position of each auxiliary reflector is fixed with respect to the main reflector.

According to one embodiment, at least one auxiliary vertex, or each auxiliary vertex, is placed at a distance, with respect to the main base plane different from a distance between the main vertex and the main base plane, the distance being measured perpendicular to the main base plane.

According to one embodiment, the target comprises at least two auxiliary reflectors, or at least three auxiliary reflectors, fastened to the main reflector. Each auxiliary vertex may be positioned at the same distance with respect to the main vertex, in a direction perpendicular to the main base plane. At least two auxiliary vertices may be respectively positioned at two different distances from the main vertex, the distances being measured perpendicular to the main base plane.

Each reflector defines a volume, delineated by the faces forming said reflector and the base plane of said reflector. The target may be such that the volumes respectively defined by at least two reflectors, chosen from the main reflector and an auxiliary reflector, are different.

According to one embodiment,
two adjacent main faces are separated by a ridge, extending from the main vertex;
at least one auxiliary vertex of one auxiliary reflector, called the internal auxiliary reflector, is located on said ridge;
the internal auxiliary reflector is delineated by:
said adjacent main faces, the latter forming the auxiliary faces of the auxiliary reflector;
a transverse auxiliary face extending between the adjacent main faces, parallel to a main face opposite said adjacent main faces.

The target may be such that it comprises a plurality of auxiliary reflectors, each auxiliary reflector being an internal reflector.

According to one embodiment,
the main reflector delineates an internal space, lying between the main faces and the main base plane;
at least one auxiliary reflector is placed outside the internal space.

A second subject of the invention is a method for estimating a movement of a target according to the first subject to the invention, comprising, during an inspecting phase:
a) exposing the target to an incident acoustic wave emitted by an acoustic emitting source, the incident acoustic wave propagating along an axis of incidence, the axis of incidence being inclined by an angle smaller than 30° to an axis perpendicular to the main base plane of the target;
b) consecutively to step a), detecting an acoustic wave reflected by the target, the reflected acoustic wave propagating along an axis of reflection parallel to the axis of incidence;
c) on the basis of the acoustic wave detected in step b), determining a position of the target, the position comprising a location and/or an orientation of the target;

the method also comprising:
d) taking into account a reference position of the target, comprising a reference location and/or a reference orientation of the target;
e) comparing the position of the target, resulting from step c), with the reference position.

The method may comprise:
f) on the basis of the comparison resulting from step e), estimating a movement of the target with respect to the reference position.

The reference position may be estimated by carrying out steps a), b) and c) prior to the inspecting phase. The reference position may be defined on the basis of a plan or of a three-dimensional model.

The target may be fastened to a piece of equipment or to a structural element, the method comprising estimating a movement of the piece of equipment or of the structural element with respect to a reference configuration. The reference configuration may notably correspond to a nominal configuration of the piece of equipment or of the structural element. The method may be intended to be used to inspect whether the piece of equipment or structural element is in the reference configuration.

The invention will be better understood on reading the description of the exemplary embodiments, which are described, in the rest of the description, with reference to the figures listed below.

DESCRIPTION OF PARTICULAR EMBODIMENTS

FIGS. 2A to 2E show a first example of a reflective ultrasonic target 1 according to the invention. The target 1 comprises a main reflector 10, formed from three planar orthogonal faces 11, 12 and 13. The three planar orthogonal faces are secant, and define a point of intersection forming a main vertex $S_{10}$. An orthogonal coordinate system X, Y, Z has been shown. The faces 11, 12 and 13 lie in orthogonal planes $P_{XZ}$, $P_{YZ}$ and $P_{XY}$, respectively.

In the example shown, the main reflector 10 is an isosceles trirectangular trihedron. Each of its faces is an isosceles right-angled triangle, the right angle of which is located at the main vertex $S_{10}$. Each face extends up to a border opposite the main vertex $S_{10}$. In the example shown, the opposite borders are referenced $11_b$, $12_b$ and $13_b$. The borders are coplanar, and lie in a main base plane $P_{10}$, forming a base of the trirectangular trihedron. By base of the trihedron, what is meant is a plane perpendicular to a height $H_{10}$ of the trihedron, the height being measured from the main vertex $S_{10}$. The main base plane $P_{10}$ and the height $H_{10}$ have been shown in FIG. 2C.

The main reflector 10 has the same properties as those of the target $1_{AA}$ described with regard to the prior art. When an incident acoustic wave reaches a face of the main reflector, by propagating along an axis of incidence $\Delta_i$, the main reflector 10 reflects the incident wave, so as to form a reflected wave that propagates, from the reflector, along an axis of reflection $\Delta_r$ parallel to the axis of incidence. This effect of reflection, parallel to the axis of incidence $\Delta_i$, occurs in an angular range of incidence $\Omega$ of +/−25° or 30° with respect to a direction perpendicular to the main base plane $P_{10}$.

The faces of the main reflector are rigid and their roughness is small compared to the ultrasonic wavelengths used. They are preferably formed from a material having good properties as regards reflection of an ultrasonic acoustic wave at the interface with the ambient medium. It is for example a question of faces made of stainless steel, which are intended to be submerged in water or in a liquid metal. The portion delineated by the borders $11_b$, $12_b$ and $13_b$, along the main base plane $P_{10}$, is preferably open, so as to promote propagation of the acoustic wave through the main base plane. Otherwise, it may comprise a small thickness of a rigid material.

The reflective target 1 comprises at least one auxiliary reflector. In the described example, the reflective target 1 comprises three auxiliary reflectors 20, 30 and 40, this being a preferred configuration.

Each auxiliary reflector 20, 30, 40 is securely fastened to the main reflector 10. The target is intended to be placed against a piece of equipment, with a view to inspecting it using an acoustic inspection modality. Prior to its placement against the piece of equipment, the target is a monolithic part of integral construction. As described below, an auxiliary reflector 20, 30, 40 may be placed in an internal space delineated by the main reflector 10, or be joined to the main reflector by a mount. Thus, when the target 1 is moved, the movement affects both the main reflector 10 and each auxiliary reflector.

Just like the main reflector 10, each auxiliary reflector is an isosceles trirectangular trihedron. Each auxiliary reflector 20, 30, 40 is formed by three planar auxiliary faces, which are orthogonal to one another, and the intersection of which forms a vertex, called the auxiliary vertex. Each auxiliary face is the shape of an isosceles right-angled triangle, the triangle being right at the auxiliary vertex. Each auxiliary face extends, from the auxiliary vertex, to a border. The borders of the auxiliary faces of each auxiliary reflector define an auxiliary base plane. They may be coplanar. The auxiliary base plane forms a base of the auxiliary trihedron. The base is a plane perpendicular to a height of the auxiliary trihedron, the height being measured from the auxiliary vertex. FIG. 2C shows respective heights $H_{10}$, $H_{20}$ extending from the vertex $S_{10}$ of the main reflector 10 and from the vertex $S_{20}$ of an auxiliary reflector 20. FIG. 2C also show shows the main base plane $P_{10}$ and the auxiliary base plane $P_{20}$ of the auxiliary reflector.

Figure 2A:
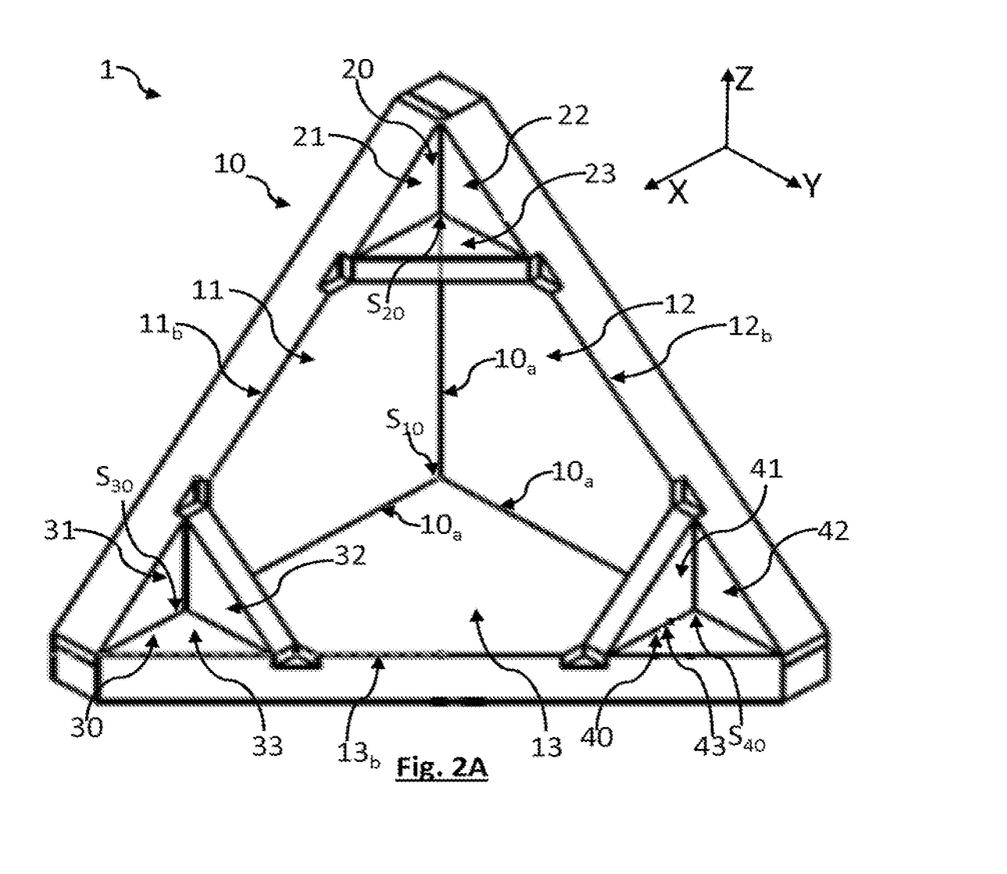
FIGS. 2A to 2C show a first embodiment of the invention.

FIG. 2A shows:
a first auxiliary reflector 20, extending between a first auxiliary face 21, a second auxiliary face 22 and a third auxiliary face 23, about a first auxiliary vertex $S_{20}$;
a second auxiliary reflector 30, extending between a first auxiliary face 31, a second auxiliary face 32 and a third auxiliary face 33, about a second auxiliary vertex $S_{30}$;
a third auxiliary reflector 40, extending between a first auxiliary face 41, a second auxiliary face 42 and a third auxiliary face 43, about a third auxiliary vertex $S_{40}$.

In this first example, each auxiliary reflector lies in a space delineated by the main reflector 10, between the main vertex $S_{10}$ and the main base plane $P_{10}$. Such auxiliary reflectors are designated "internal reflectors". The reflective target 1 is then particularly compact. More precisely, each auxiliary reflector 20, 30, 40 is defined such that:
a first auxiliary face and a second auxiliary face correspond to respective portions of two adjacent main faces of the main reflector, said portions extending from the respective borders of said adjacent main faces;
a third auxiliary face extends parallel to a main face of the main reflector, said main face being opposite said adjacent main faces.

Thus:
the auxiliary faces 21 and 22 of the first auxiliary reflector 20 are respectively two portions of the main faces 11 and 12 of the main reflector, said portions being adjacent to two borders $11_b$ and $12_b$ of the main reflector. The other auxiliary face 23 of the first auxiliary reflector 20 extends parallel to another main face 13.
the auxiliary faces 31 and 33 of the second auxiliary reflector 30 are respectively two portions of the main faces 11 and 13 of the main reflector, said portions being adjacent to two borders $11_b$ and $13_b$ of the main reflector. The other auxiliary face 32 of the second auxiliary reflector 30 extends parallel to another main face 12.
the auxiliary faces 42 and 43 of the third auxiliary reflector 40 are respectively two portions of the main faces 12 and 13 of the main reflector, said portions being adjacent to two borders $12_b$ and $13_b$ of the main reflector. The other auxiliary face 41 of the third auxiliary reflector 40 extends parallel to another main face 11.

According to this first embodiment, the intersection between two adjacent faces of the main reflector 10 forms a ridge $10_a$ of said main reflector. In each auxiliary reflector 20, 30, 40:
the auxiliary vertex $S_{20}$, $S_{30}$, $S_{40}$ is located on a ridge of the main reflector;
the auxiliary reflector is delineated by:
two adjacent main faces (for example the main faces 11, 12 as regards the auxiliary reflector 20), one portion of the latter forming auxiliary faces (for example the auxiliary faces 21, 22 as regards the auxiliary reflector 20);
another auxiliary face 23, called the transverse auxiliary face, that extends between said adjacent main faces parallel to a main face (for example the face 13 as regards the reflector 20) opposite said adjacent main faces.

Figure 2B:
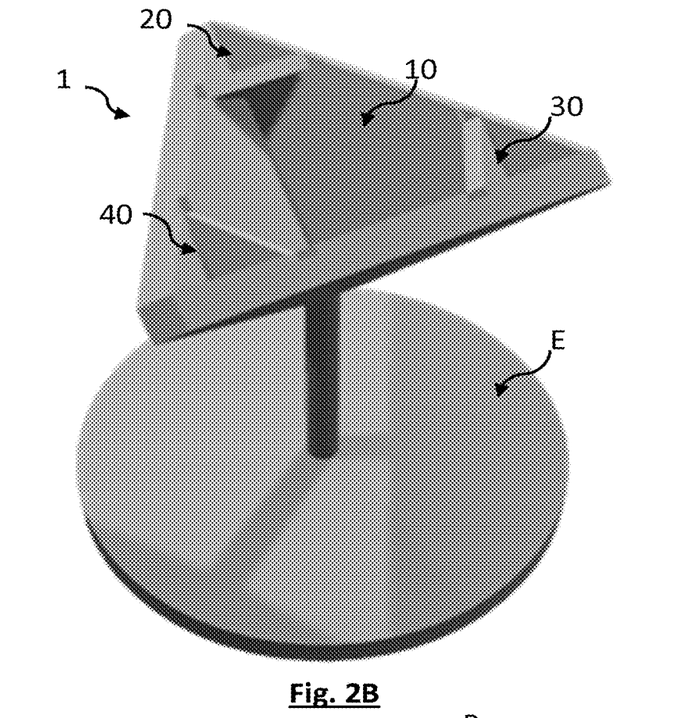
Figure 2C:
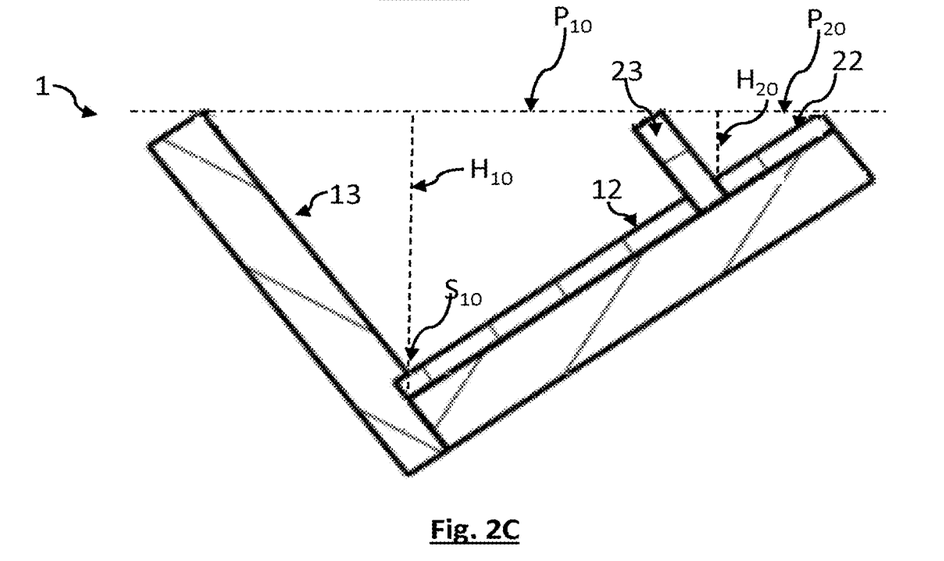

FIG. 2B shows another three-dimensional view of the target according to the first embodiment. In the first embodiment, the base planes of the main reflector and of each auxiliary reflector are coincident. More generally, the respective base planes of the main reflector 10 and of each auxiliary reflector 20, 30, 40 are parallel.

Figure 2D:
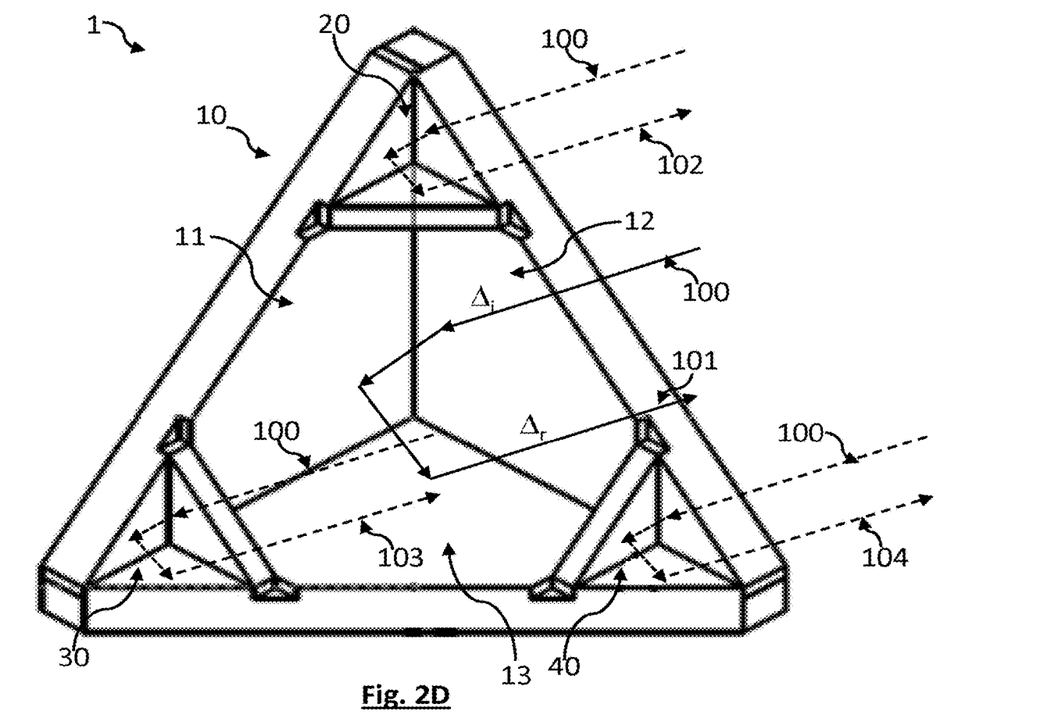
FIGS. 2D and 2E illustrate the operation of the target according to the invention.

When a plane acoustic wave 100 propagates towards the target 1, along an axis of incidence $\Delta_i$, each reflector from which the target is composed reflects one portion of the incident acoustic wave so as to form a reflected wave that propagates along an axis of reflection $\Delta_r$. FIG. 2D shows:

a main reflected wave 101, reflected by the main reflector;
auxiliary reflected waves 102, 103, 104, reflected by each of the three auxiliary reflectors, respectively.

Because of the spatial offset between the various reflectors, the auxiliary reflected waves 102, 103, 104 are temporally shifted with respect to the main reflected wave 101, this resulting in a temporal phase shift. In the example shown in FIG. 2D, the main reflected wave 101 is delayed with respect to the auxiliary reflected waves.

Figure 2E:
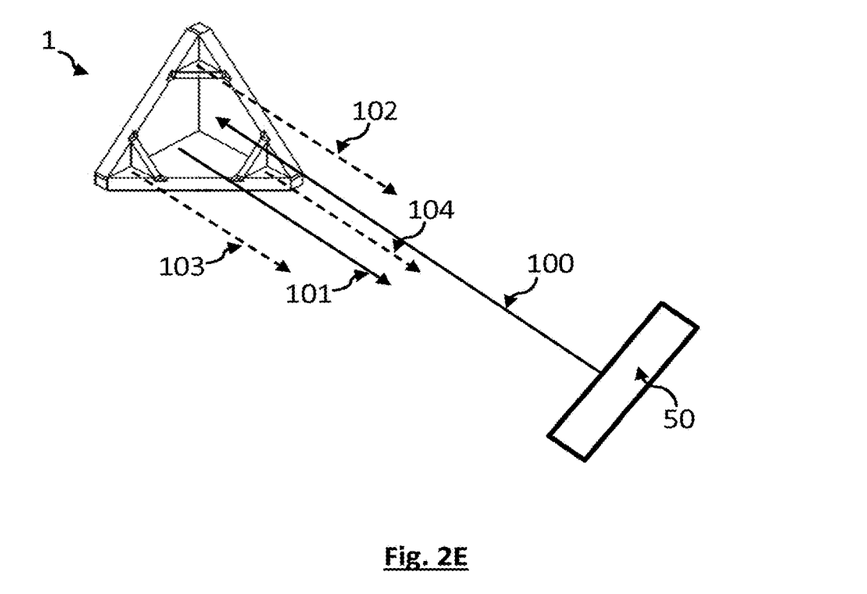

In FIG. 2E, a target 1 such as described above has been shown placed facing a transducer 50. The transducer 50 is for example a piezoelectric transducer, which acts both as transmitter and receiver of an acoustic wave, and which is located sufficiently far from the target that the angle of incidence of the incident acoustic wave may be considered to be identical on all portions of the target. The transducer 50 is configured to transmit an incident acoustic wave 100 that propagates towards the target, parallel to an axis of incidence $\Delta_i$. Under the effect of reflections from the various reflectors from which the target is composed, four reflected waves 101, 102, 103 and 104 are formed, which propagate parallel to the axis of incidence, in the direction of the transducer. Because of the spatial offset between the various reflectors, the auxiliary reflected waves 102, 103 and 104 are shifted in time with respect to the main reflected wave 101.

Depending on the angle of incidence, the auxiliary reflected waves may be shifted with respect to one another. The angle of incidence depends on the position of the transducer 50 with respect to the target 1. According to this first embodiment, when the angle of incidence $\Delta_i$ is perpendicular to the main base plane $P_{10}$, the auxiliary reflected waves are synchronous, i.e. not temporally shifted with respect to one another, assuming a plane incident acoustic wave. This is due to the fact that, in this first embodiment, each auxiliary vertex $S_{20}$, $S_{30}$ and $S_{40}$ is equidistant from the main vertex $S_{10}$, taking into account a distance measured perpendicular to the base plane $P_{10}$.

As mentioned above, each reflected wave 101, 102, 103, 104 propagates along an axis of reflection $\Delta_r$ parallel to the axis of incidence. This effect of reflection, parallel to the axis of incidence $\Delta_i$, occurs in an angular range of incidence $\Omega$ of +/−25° or 30° with respect to a direction perpendicular to the base of each reflector. The geometric shape of the trirectangular trihedron allows the angular range $\Omega$ in which the effect of "parallel reflection" occurs to be maximized. Moreover, the fact that the base planes of each reflector are parallel to one another allows the angular range $\Omega$ to be the same for all the reflectors from which the target is formed, whether it is a question of the main reflector or of the auxiliary reflectors.

The intensity of each reflected acoustic wave is maximum at normal incidence, i.e. when the axis of incidence $\Delta_i$ is perpendicular to the base of each reflector: this corresponds to one preferred configuration. When the base planes of each reflector are parallel, the angular response of each reflector is similar. By angular response, what is meant is a relative intensity of a reflected wave with respect to the intensity of the incident wave, as a function of the angle of incidence.

Figure 3A:
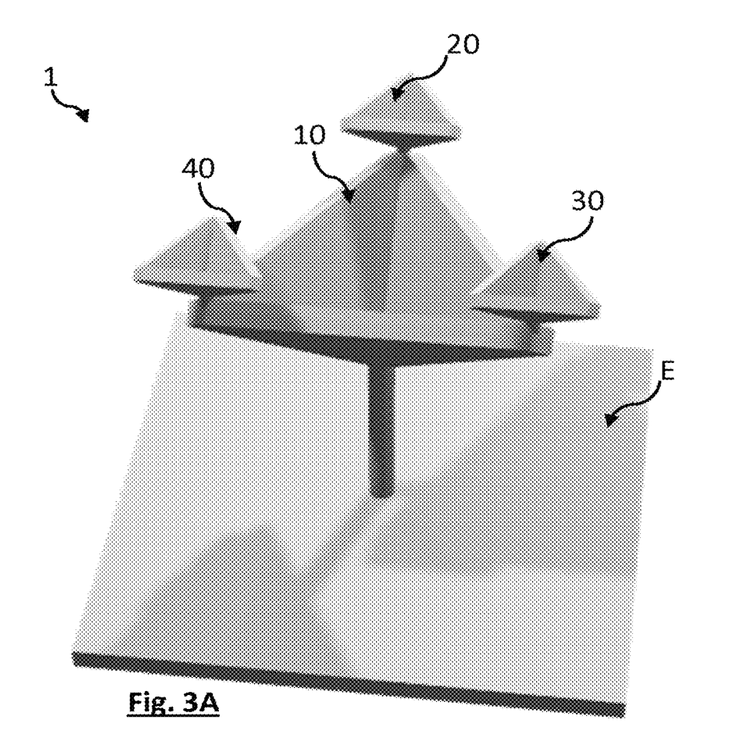
FIGS. 3A and 3B show a second and third embodiment of the invention, respectively.

FIG. 3A shows a second embodiment, in which the vertex of each auxiliary reflector 20, 30, 40 is joined to the borders of the main reflector 10. According to this embodiment, each auxiliary reflector lies outside the internal space delineated by the main reflector. In the embodiment shown in FIG. 3A, just as in the first embodiment, the base plane of each auxiliary reflector is parallel to the base plane of the main reflector. In FIG. 3A, a piece of equipment E, in the present case a plate, to which the target 1 is fastened, has been shown.

It will also be noted that, as in the first embodiment, the vertices of each auxiliary reflector are equidistant from the vertex of the main reflector, considering a distance measured along an axis perpendicular to the main base plane. Such an equidistance is not essential. In a third embodiment, illustrated in FIG. 3B, the vertices of the auxiliary reflectors 30 and 40 are joined to the borders of the main reflector 10 by a holder 35, 45, a rod for example, respectively. Each holder forms one mount of the target. The lengths of each holder are different. In this embodiment, the respective distances between each auxiliary vertex $S_{20}$, $S_{30}$, $S_{40}$ and the main vertex $S_{10}$ are different.

Figure 3B:
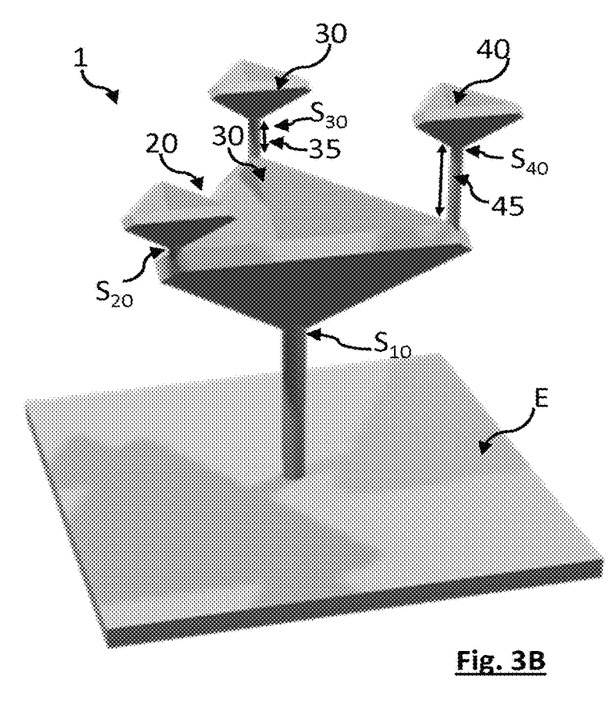

According to this embodiment, just as in the second embodiment:

each auxiliary reflector lies outside the internal space delineated by the main reflector;
the base planes of each auxiliary reflector are parallel to the base plane of the main reflector.

Whatever the embodiment, the target 1 is intended to be fastened to a piece of equipment that it is necessary to inspect periodically, using an acoustic modality in which the piece of equipment is exposed to an incident acoustic wave 100. As described with regard to the prior art, it may for example be a question of a piece of equipment submerged in an opaque medium, making visual inspection impossible. One targeted application is for example the inspection of pieces of equipment submerged in liquid lead or sodium in a fast-neutron nuclear reactor.

Because of its geometric configuration, each reflector from which the target is formed is particularly echogenic, and produces a reflected wave the intensity of which is generally higher than that of an acoustic wave reflected by a planar surface. Use of a target comprising various reflectors allows, following insonification of the target, reflected waves that are intense and temporally shifted, in the sense that the acoustic wave reflected by the main reflector is temporally shifted with respect to an acoustic wave reflected by an auxiliary reflector, or even with respect to each acoustic wave reflected by the auxiliary reflectors, to be obtained. Each reflected wave is conventionally designated by the term "echo". The target 1 allows a main echo, and at least one, and preferably more than one, auxiliary echoes to be formed. Because of the time shift between each auxiliary echo and the main echo, the main echo may be easily differentiated from each auxiliary echo.

Moreover, the amplitude of each echo depends on the dimensions of a reflector. In the embodiments described above, the main reflector 10 has larger dimensions then each auxiliary reflector. Thus, the main reflector generates a more intense echo than the auxiliary reflectors, this also allowing the identification of the main echo with respect to the auxiliary echoes to be facilitated. Thus, if each reflector is considered to delineate one volume, comprised between each face and the base of said reflector, it is preferable for the volumes respectively delineated by two different reflectors to be different. For example, the volume of the main reflector may be larger, or smaller, than the volume of each auxiliary reflector.

Whatever the embodiment, the length of a ridge of the main reflector may be comprised between 2 cm and a few tens of centimetres, 30 or 40 cm for example. The length of a ridge of each auxiliary reflector is preferably comprised between 0.25 times and 4 times the length of a ridge $10_a$ of the main reflector.

The detection and identification of the echoes generated by each reflector allows information on the position, in space, of each reflector, to be obtained using methods that are conventional in the field of non-destructive inspection with ultrasound. It is thus possible to estimate the position of the target in space. By position of the target, what is meant is a location, for example a distance with respect to the ultrasonic transducer and/or an orientation of the target with respect to the axis of incidence.

In the embodiments described above, each face of each auxiliary reflector is parallel to one face of the main reflector. However, this is not essential. In these embodiments, the faces of the auxiliary reflectors may not be parallel to the faces of the main reflector.

Figure 4A:
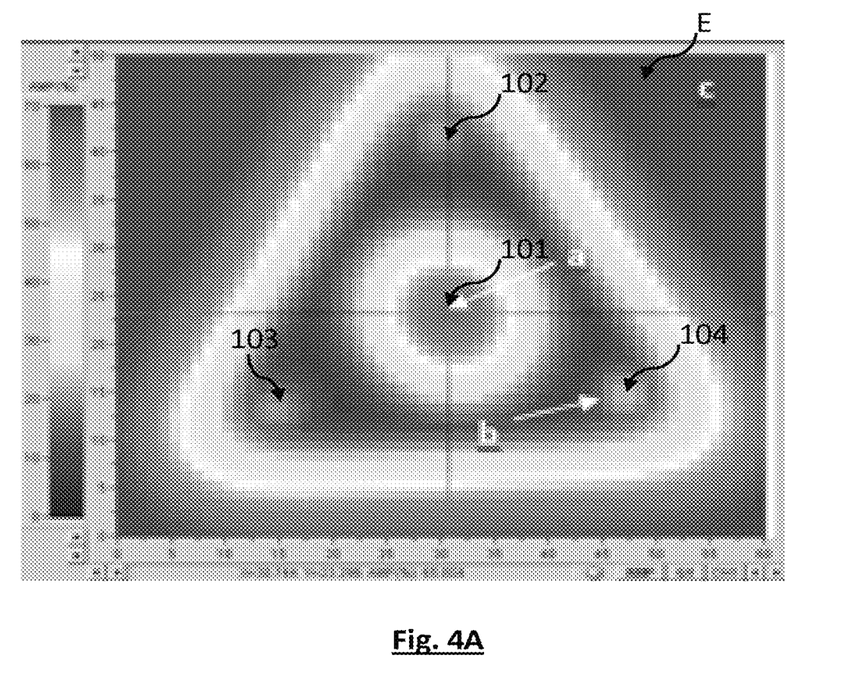
FIGS. 4A and 4B show C-scan maps produced by placing a transducer facing a target according to the first embodiment. In this configuration, the acoustic wave transmitted by the transducer propagates perpendicular to the main base plane of the target.

FIG. 4A shows a C-scan map that was obtained experimentally using a target according to the first embodiment. In this example, an acoustic transducer such as described above, which was configured to transmit an incident acoustic wave and to detect reflected acoustic waves, was used. The transducer was placed at a distance of 25 cm from the main base plane of the target. The incident acoustic wave was transmitted with a central frequency of 2.25 MHz, the axis of incidence being perpendicular to the base plane of the target. The acoustic transducer, which was ½ inch in width, and the target were placed in water, the speed of propagation of the acoustic wave being 1490 m·s$^{-1}$.

The term C-scan is known to those skilled in the art. It corresponds to a map of the maximum amplitude of the acoustic echoes detected along a detection surface scanned by an acoustic transducer. The detection surface preferably lies perpendicular to the axis of incidence. The greyscale level is therefore representative of the amplitude of the echoes. In the case of FIG. 4A, the C-scan map is therefore obtained on a detection surface parallel to the main base plane of the target. The axis of incidence $\Delta_i$ is perpendicular to the detection surface. An intense echo 101 (also referenced by the letter a), originating from the main reflector 10, and three echoes 102, 103 and 104 (also referenced by the letter b), of lesser amplitude, corresponding to the auxiliary reflectors 20, 30 and 40, are observed. Outside the main reflector, the echo originating from the plate E, which is also referenced by the letter c, is observed.

Figure 4B:
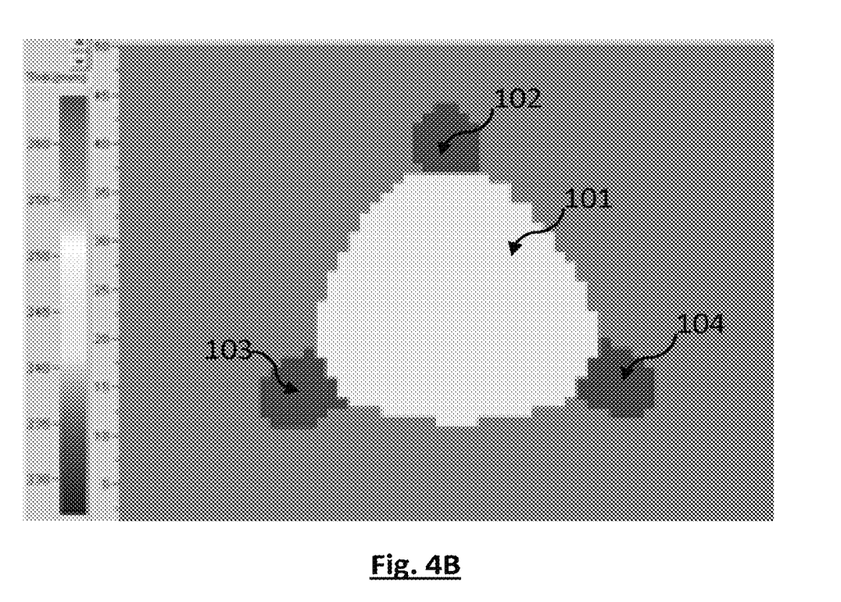

FIG. 4B shows a C-scan map in which the time-of-flight of the detected echoes, i.e. the time between the transmission of the incident acoustic wave and the detection of the echo, has been shown rather than a spatial amplitude distribution.

The greyscale level is therefore representative of the time-of-flight and therefore of the distance between each reflector and the ultrasonic sensor. It may be seen that the time-of-flight of the auxiliary echoes 102, 103 and 104 is less than the time-of-flight of the main echo 101. This is due to the fact that the auxiliary reflectors are closer to the detection surface than the main reflector. In this configuration, since the detection surface is parallel to the base planes of each reflector of the target, and all the auxiliary reflectors share a base plane, the times-of-flight of each auxiliary echo are equal, to within measurement uncertainty.

Whereas FIG. 4A allows two-dimensional spatial information to be obtained parallel to the detection surface, FIG. 4B allows information on depth (rangefinding measurement) perpendicular to the detection surface to be accessed.

A combination of FIGS. 4A and 4B allows a position of the target in space to be estimated. By position, what is meant is a location and/or orientation of the target. It may advantageously be compared to a reference position of the target. Comparison of the position of the target, in an inspecting phase, with the reference position, allows any movement of the target to be detected. The reference position may have been established using reference ultrasound measurements taken in a reference phase prior to (or preceding) the inspecting phase. It may also be obtained theoretically, for example on the basis of 3D models or plans and/or by way of another measurement modality.

Figure 4C:
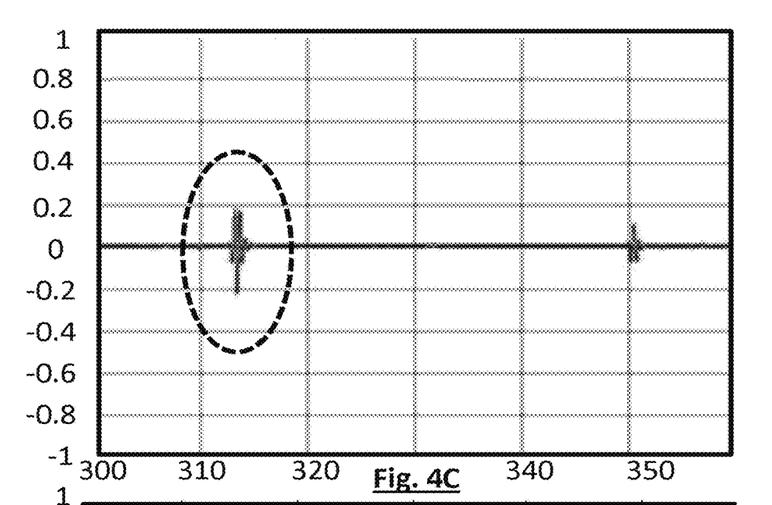
FIGS. 4C, 4D and 4E show timing diagrams showing the detection of an echo reflected by the auxiliary reflectors of the target, by the main reflector of the target, and by a piece of equipment, in the present case a plate to which the target has been fastened, respectively.
Figure 4D:
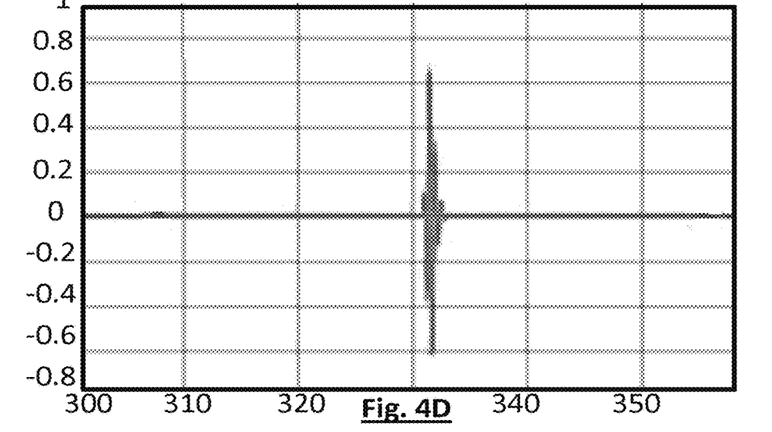
Figure 4E:
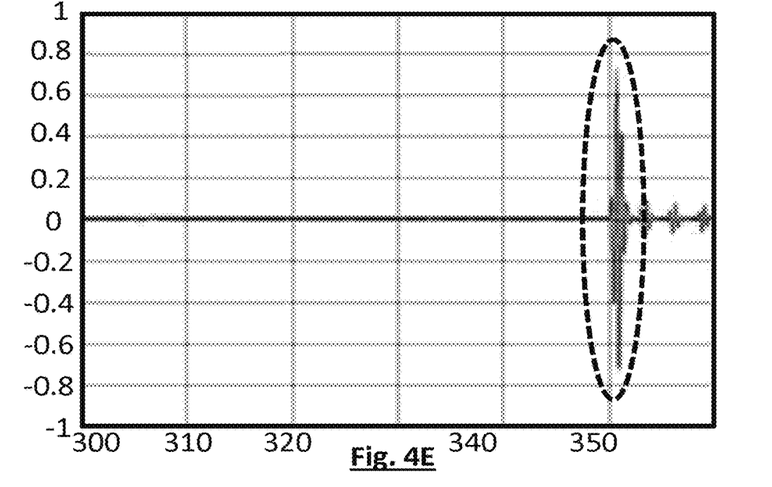

FIGS. 4C, 4D and 4E show timing diagrams of detected echoes reflected by the auxiliary reflectors, the main reflector and the plate E to which the target is fastened, respectively. In the FIGS. 4C to 4E, the x-axis corresponds to time (unit microseconds µs), whereas the y-axis corresponds to amplitude (arbitrary unit). FIGS. 4C and 4E allow the following to be observed:
  the order of detection of the reflected acoustic waves: the echo of the auxiliary reflectors (FIG. 4C) is detected before the echo of the main reflector (FIG. 4D), the latter being detected before the echo of the plate (FIG. 4E);
  the differences in intensity between the various echoes: it may be seen that the intensity of the echoes of the auxiliary reflectors is lower than for the echoes of the main reflector or the plate.

Figure 5A:
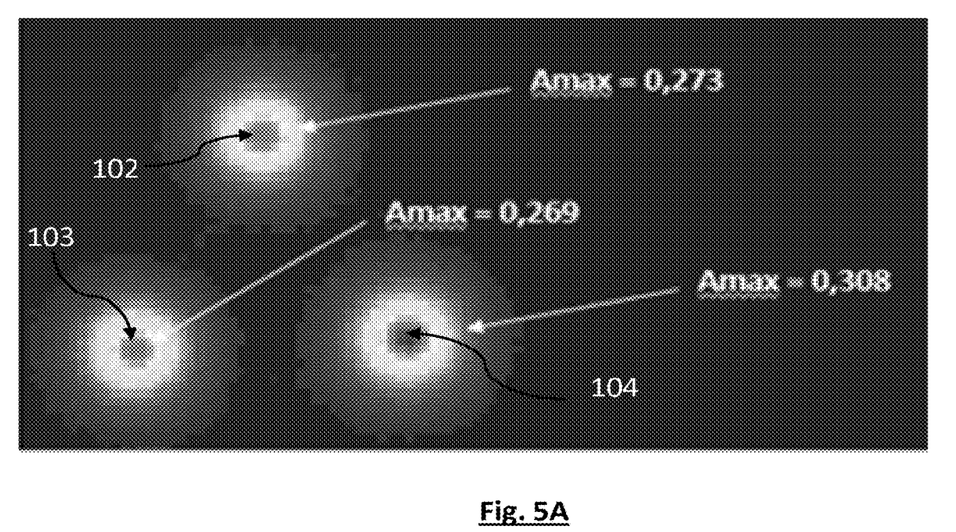
FIGS. 5A and 5B show C-scan maps produced by placing a transducer facing a target according to the first embodiment. In this configuration, the acoustic wave transmitted by the transducer propagates at an inclination to a normal to the main base plane of the target.
Figure 5B:
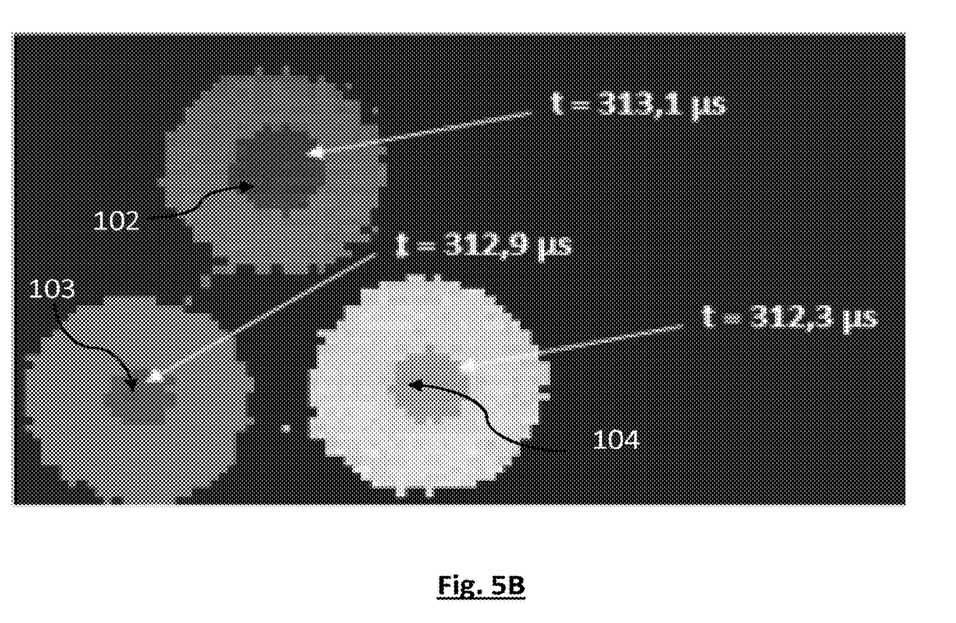

FIGS. 5A and 5B are C-scan maps of amplitude and time-of-flight, respectively, that were obtained by placing a transmission/detection surface of a transducer inclined with respect to the base plane of each reflector. This corresponds to a slight rotation of the target with respect to the transmission/detection surface of the transducer. In these figures, only the echoes of the auxiliary reflectors have been shown. In these figures, it may be seen that:
  the maximum amplitudes Amax of the echoes 102, 103 and 104 are 0.273, 0.269 and 0.308, respectively;
  the times-of-flight t of the echoes 102, 103 and 104 are 313.1 µs, 312.9 µs and 312.3, respectively.

Given the speed of the waves in water, a time-of-flight shift of 1 µs is estimated to correspond to a distance of 0.7 mm.

It may be concluded that the auxiliary reflector 20 that was the origin of the echo 102 is further from the transmission/detection surface (longer time-of-flight), whereas the auxiliary reflector 40 that was the origin of the echo 104 is closer.

Figure 5C:
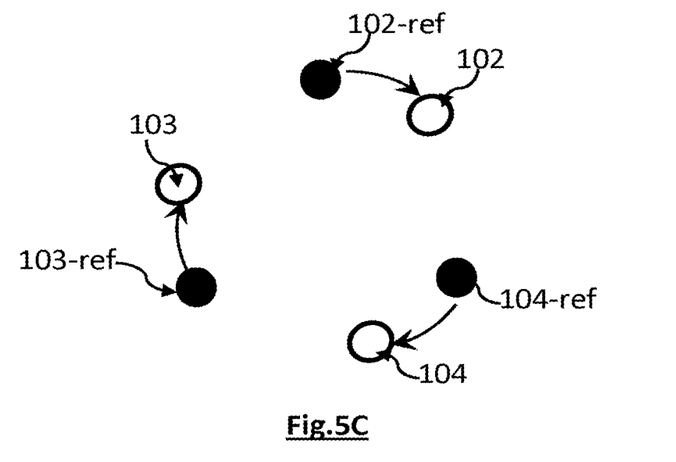
FIG. 5C illustrates a rotation of the target about an axis perpendicular to the base plane of the main reflector and passing through the main vertex.

FIG. 5C illustrates a rotation of the target between a reference position, in which position each auxiliary reflector has been represented by a dark solid disc, and a measurement position, adopted in an inspecting phase, in which position each auxiliary reflector has been represented by a ring. In this figure, the transmission/detection surface of the transducer is assumed to be parallel to the base plane of the main reflector. Comparison of the positions shows a rotation of the target between the reference position and the measured position, about an axis of rotation perpendicular to the base planes of each reflector, and passing through the vertex of the main reflector.

Figure 6:
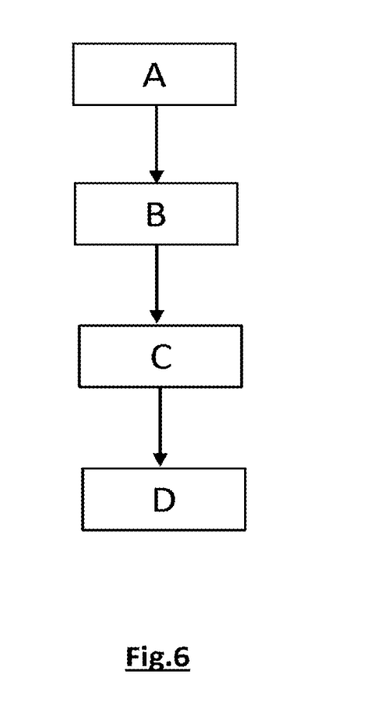
FIG. 6 shows the main steps of a method implementing the invention, for the purposes of inspecting a piece of equipment.

FIG. 6 illustrates the main steps of implementation of a target such as described above. The target is fastened to a piece of equipment E, the position of which it is desired to inspect. It may for example be a question of a piece of equipment of a nuclear reactor cooled with liquid sodium or lead.

Step A: placing a transducer 50 facing the target 1 and transmitting an incident acoustic wave toward the target. By toward the target, what is meant is in an angular range extending from 0° (axis of incidence perpendicular to the base plane $P_{10}$) up to ±25° or 30° with respect to a normal to the base plane $P_{10}$ of the main reflector 10. The smaller the angle of incidence, the higher the intensity of the echo. Preferably, the acoustic wave is a plane wave by the time it reaches the target. The acoustic wave it is generally an ultrasonic wave, the acoustic frequency being comprised between 20 kHz and 10 MHz.

Step B: detecting echoes respectively produced by the main reflector and by each auxiliary reflector of the target. In this example, the detection is carried out by the same transducer 50, which acts as transmitter in step A then receiver in this step B.

Step C: on the basis of the echoes detected in step B, estimating a position (location and/or orientation) of the target 1. Step C is generally carried out by a processing unit using the measurements resulting from the transmitting/receiving transducer 50. According to the principles of time-of-flight rangefinding, given a speed of propagation of the acoustic wave, a measurement of the time-of-flight (time interval between the transmission of the incident wave and the detection of the reflected wave) allows a distance between the transducer 50 and each reflector to be estimated. The processing unit is programmed to implement algorithms for processing acoustic signals.

Step D: comparing the position of the target to a reference position, so as to estimate any movement of the target between the reference position and the position estimated from the echoes measured in step B. The reference position may have been established by carrying out steps A, B and C in a prior phase, called the reference phase. Alternatively, the reference position may be established on the basis of a plan or of a 3D model.

According to one possibility, in step D, the distances between the transducer 50 and each reflector (main reflector and auxiliary reflectors) are compared with reference distances respectively established for each reflector. When a measured distance does not correspond to a reference distance, the processing unit generates an anomaly signal. The position of the target may then be updated.

The invention takes advantage of the echogenic character of the target, this facilitating an experimental determination of its position in space. On the basis of the comparison made in step D, it is possible to conclude that the equipment to which the target is fastened has moved or has not moved, with respect to a reference configuration. Specifically, because the target is of integral construction and is fastened to the piece of equipment, the movement of the target reflects the movement of the piece of equipment against which it was placed.

Whatever the embodiment, the target comprises at least the main reflector and at least one auxiliary reflector. It is preferable for the target to comprise at least three auxiliary reflectors.

The number of auxiliary reflectors may be modified depending on the number of degrees of freedom with which the target is considered to be able to move, and/or depending on bulk constraints.

The invention will possibly be employed to inspect pieces of equipment or structures bathing in opaque media, or pieces of equipment or structures that are unable to be illuminated, and in particular pieces of equipment or structures that are submerged in liquids, in particular opaque liquids. It may also be a question of pieces of equipment masked by an opaque screen. The opaque screen may for example be made of metal or of plastic.

More generally, the invention may be applied in environments that are incompatible with recourse to conventional imaging means. It may for example be a question of environments in which the temperature or irradiation level is very high, making remote measurement essential. The invention may be employed in the nuclear industry, to inspect the integrity of structures. It may also be relevant to other industrial sectors in which opaque fluids or complex pieces of equipment are employed, for example the food-processing industry or the chemical or oil-and-gas industry, or even the aeronautic industry.

The invention claimed is:

1. An ultrasonic target, comprising:
   a main reflector
      comprising three main faces, extending from a main vertex, the main faces forming a main trirectangular trihedron by lying on orthogonal planes, and
      defining a main base plane, lying facing the main vertex, and forming a base of the main trirectangular trihedron; and
   at least one auxiliary reflector fastened to the main reflector, the at least one auxiliary reflector
      comprising three auxiliary faces, extending from an auxiliary vertex, the auxiliary faces forming an auxiliary trirectangular trihedron, and
      defining an auxiliary base plane, lying facing the auxiliary vertex, and forming a base of the auxiliary trirectangular trihedron, wherein
   the auxiliary base plane or each auxiliary base plane is parallel to the main base plane,
   two adjacent main faces of said main trirectangular trihedron are separated by a ridge and extending from the main vertex,
   at least one auxiliary reflector is an internal auxiliary reflector,
   the auxiliary vertex of the internal auxiliary reflector is located on said ridge, and
   the internal auxiliary reflector is delineated by:
      said adjacent main faces, forming the auxiliary faces of the internal auxiliary reflector; and
      a transverse auxiliary face extending between the adjacent main faces, parallel to a main face opposite said adjacent main faces.

2. The target of claim 1, wherein at least one auxiliary vertex, or each auxiliary vertex, is placed at a distance, with respect to the main base plane different from a distance between the main vertex and the main base plane, the distance being measured perpendicular to the main base plane.

3. The target of claim 1, comprising at least two auxiliary reflectors fastened to the main reflector.

4. The target of claim 1, wherein each auxiliary vertex is positioned at the same distance with respect to the main vertex, in a direction perpendicular to the main base plane.

5. The target of claim 1, wherein at least two auxiliary vertices are respectively positioned at two different distances from the main vertex, the distances being measured perpendicular to the main base plane.

6. The target of claim 1, wherein each reflector defines a volume, delineated by the faces forming said reflector and the base plane of said reflector, the target being such that the volumes respectively defined by at least two reflectors, chosen from the main reflector and one auxiliary reflector, are different.

7. The target of claim 1, comprising a plurality of auxiliary reflectors, each auxiliary reflector being an internal reflector.

8. The target of claim 1, wherein:
the main reflector delineates an internal space, lying between the main faces and the main base plane;
at least one auxiliary reflector is placed outside the internal space.

9. The target of claim 8, comprising at least two auxiliary reflectors fastened to the main reflector, each auxiliary reflector being placed outside of the internal space.

10. A method for detecting a movement of an ultrasonic target that includes a main reflector comprising three main faces, extending from a main vertex, the main faces forming a main trirectangular trihedron by lying on orthogonal planes, and defining a main base plane, lying facing the main vertex, and forming a base of the main trirectangular trihedron; and
at least one auxiliary reflector fastened to the main reflector, each of the at least one auxiliary reflector comprising three auxiliary faces, extending from an auxiliary vertex, the auxiliary faces forming an auxiliary trirectangular trihedron, and defining an auxiliary base plane, lying facing the auxiliary vertex, and forming a base of the auxiliary trirectangular trihedron, wherein
the auxiliary base plane or each auxiliary base plane is parallel to the main base plane, two adjacent main faces of said main trirectangular trihedron are separated by a ridge and extending from the main vertex, at least one auxiliary reflector is an internal auxiliary reflector, the auxiliary vertex of the internal auxiliary reflector is located on said ridge, and the internal auxiliary reflector is delineated by: said adjacent main faces, forming the auxiliary faces of the internal auxiliary reflector; and a transverse auxiliary face extending between the adjacent main faces, parallel to a main face opposite said adjacent main faces, the method comprising, during an inspecting phase:
a) exposing the target to an incident acoustic wave emitted by an acoustic emitting source, the target being separated from the acoustic emitting source, the incident acoustic wave propagating along an axis of incidence, the axis of incidence being inclined by an angle smaller than 30° to an axis perpendicular to the base plane of the target;
b) consecutively to a), detecting an acoustic wave reflected by the target, the reflected acoustic wave propagating along an axis of reflection parallel to the axis of incidence;
c) on a basis of the acoustic wave detected in b), determining a position of the target, the position comprising a location and/or an orientation of the target;
d) taking into account a reference position of the target, comprising a reference location and/or a reference orientation of the target; and
e) comparing the position of the target, resulting from c), with the reference position.

11. The method of claim 10, further comprising:
f) on a basis of the comparison resulting from e), estimating a movement of the target with respect to the reference position.

12. The method of claim 11, wherein the reference position is estimated by implementing a), b) and c) prior to the inspecting phase.

13. The method of claim 11, wherein the reference position is defined on the basis of a plan or of a three-dimensional model.

14. The method of claim 10, wherein the target is fastened to a piece of equipment or to a structural element, the method comprising estimating a movement of the piece of equipment or of the structural element with respect to a reference configuration.

\* \* \* \* \*